United States Patent [19]

Romero

[11] Patent Number: 5,010,785

[45] Date of Patent: Apr. 30, 1991

[54] CRANK ARM FOR A BICYLCE

[75] Inventor: Ysmael E. Romero, Santa Paula, Calif.

[73] Assignee: Seattle Bike Supply, Kent, Wash.

[21] Appl. No.: 535,703

[22] Filed: Jun. 11, 1990

[51] Int. Cl.$^5$ .............................................. G05G 1/14
[52] U.S. Cl. .................................. 74/594.1; 74/579 R
[58] Field of Search ........................... 74/594.1–594.4, 74/579 R–580

[56] References Cited

U.S. PATENT DOCUMENTS

| 626,227 | 6/1899 | Gaylor | 74/594.1 X |
|---|---|---|---|
| 4,171,822 | 10/1979 | Thun | 74/594.1 X |
| 4,704,919 | 11/1987 | Durham | 74/594.2 X |
| 4,728,218 | 3/1988 | Durham | 74/594.1 X |
| 4,770,058 | 9/1988 | Lilie et al. | 74/579 R X |
| 4,930,405 | 6/1990 | Lilie | 74/579 E X |

FOREIGN PATENT DOCUMENTS

| 3235288 | 4/1983 | Fed. Rep. of Germany | 74/594.1 |
|---|---|---|---|
| 955017 | 1/1950 | France | 74/594.1 |
| 2416829 | 9/1979 | France | 74/594.1 |
| 2528377 | 12/1983 | France | 74/594.1 |
| 2537534 | 6/1984 | France | 74/594.1 |
| 445245 | 2/1949 | Italy | 74/594.1 |

Primary Examiner—Vinh T. Luong
Attorney, Agent, or Firm—Jack C. Munro

[57] ABSTRACT

A tubular crank arm to be connected between the pedal and the hub bearing assembly of a bicycle. The inner end of the crank arm includes a spline connection and the outer end of the crank arm includes a threaded connection. The threaded connection is mounted within a plug. This plug has an irregularly shaped exterior surface. This plug is to be welded to the housing with the exterior surface of the plug also establishing a mechanical interlocking connection with the tubular housing over and above that of the welding securement of the plug to the housing.

5 Claims, 1 Drawing Sheet

CRANK ARM FOR A BICYLCE

BACKGROUND OF THE INVENTION

1. Field of the Invention

The field of this invention relates to bicycles and more particularly to a novel crank arm for a bicycle that interconnects between the pedal and the hub bearing assembly of the bicycle.

2. Description of the Prior Art

Within recent years, bicycles have made a significant come-back and are being extensively used by a large number of people. Bicycles are not only used for pleasure riding but are used extensively in competition. It makes sense that the lighter the bicycle, the more the advantage the user has in a competitive situation. In the past, in order to make bicycles lighter, bicycles have been constructed out of newer, stronger, lighter materials such as titanium and magnesium. These materials are utilized not only in constructing of the wheels of the bicycle, but also in construction of the frame.

Every part of the bicycle is now being designed with weight reduction in mind and also to maximize strength. A common part for a bicycle is a crank arm with there being two crank arms located one hundred eighty degrees apart relative to the hub bearing assembly. Connected to the outer end of each crank arm is a pedal and these pedals are to be utilized by the user's legs to apply the force resulting in movement of the bicycle.

In the past, there has been some effort at designing these crank arms to be constructed of stronger, lighter material. These crank arms directly transfer the muscle power of the user into the propelling force of the bicycle. Therefore, these crank arms are subjected to a significant amount of torque. It is common for a bicycle to be operated by the user over an extended period of time (such as several hours) and the bicycle be ridden up and down hills for many miles. Also, it is common for users to be quite strong individuals capable of applying a substantial amount of torque through the crank arms. The continuous application over an extended period of time of such a high degree of torque over several weeks or months has resulted in breaking of these crank arms.

It has been found that the most common point of breakage is at the outer end of the crank arm where the pedal is connected to the crank arm. In the constructing of these lightweight crank arms, the outer end of the crank arm includes a plug. This plug includes a threaded opening which facilitates attachment to the pedal. In the past, it has been common to construct a plug to be cylindrical in exterior configuration. The only securement between the plug and the remaining portion of the crank arm is by conventional welding. If this welding breaks down, the plug will merely rotate relative to the crank arm since the exterior configuration of the plug is circular.

There is a need to construct the crank arm of a bicycle to be stronger to lessen the possibility of failure even when an excessive force is being continuously applied by a user over an extending period of time without increasing the weight of the crank arm. A few ounces of decreased weight can go a long way toward giving a particular rider a significant competitive advantage in a bicycle race.

SUMMARY OF THE INVENTION

A primary objective of the present invention is to construct a crank arm which is significantly stronger than prior art crank arms while at the same time is not of an increased weight over and above the lightweight, high strength crank arms of the prior art.

The crank arm of the present invention is constructed conventionally to be elongated with the inner end of the crank arm including a spine connection facilitating attachment to a hub bearing assembly and the outer end of the crank arm including a threaded connection facilitating its attachment to a pedal. The threaded connection is mounted within a plug. This plug having an exterior irregular shape such as being in the shape of a teardrop. The plug is located within an appropriate mating opening provided in the outer end of the housing of the crank arm. The plug is then welded to the housing of the crank arm, as a result not only is there provided the securement of the welding, but also there is a mechanical connection between the plug and the housing of the crank arm. These two types of securement significantly increase the overall strength of the crank arm, minimizing the possibility of crank arm failure.

DETAILED DESCRIPTION OF THE PREFERRED EMBODIMENT

Figure 1:
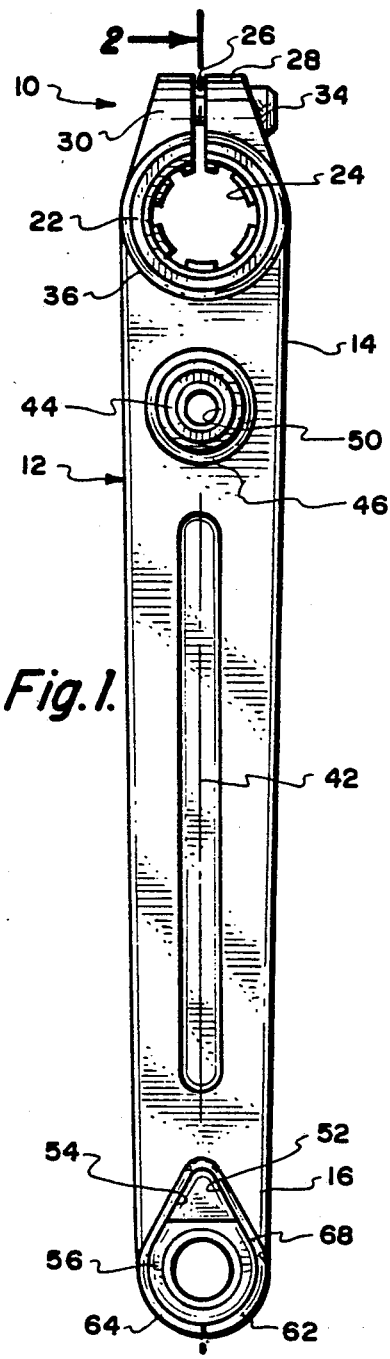
FIG. 1 is a longitudinal front view of the crank arm constructed in accordance with this invention.

Referring particularly to the drawing, there is shown the crank arm 10 which is composed of an elongated tubular housing 12 having an inner end 14 and an outer end 16. The housing 12 is hollow defining an interior chamber 18. The inner end 14 is formed to include a transverse opening 20. Mounted in a snug fitting manner within the transverse hole 20 is a plug 22. This plug 22 will generally be constructed of steel or some kind of a titanium or magnesium alloy which is also similar for the material of construction for the housing 12. This plug 22 has an interior through opening which is formed into a spline connection 24. The inner end 14 includes an elongated slot 26 which forms inner end 14 into a directly adjacent pair of flanges 28 and 30. Flange 28 includes a hole 32 with flange 30 also including a similar hole (not shown). Extending between these holes, which includes hole 32, is a threaded fastener such as a bolt 34. The spline connection 24 is to be installed on a mating spline connection of a hub bearing assembly (not shown) and is tightened securely accordingly by tightening of fastener 34 which moves flanges 28 and 30 toward each other closing of gap 26.

The plug 22 is securely fastened to the housing 12 by means of welding joints 36 and 38. Spline connection 24 has a longitudinal center axis 40. The tubular housing 12 also has a longitudinal center axis 42. There is an acute angle, angle A, between axis 40 and axis 42. Angle A will normally be about eighty-five degrees which means that the housing 12 is canted at about five degrees away from vertical which will be a line perpendicular to the axis 40. This is a desirable construction arrangement for the crank arm 10 so as to provide adequate spacing of the outer end 16 of the crank arm away from the frame of the bicycle (not shown).

Associated with the hub bearing assembly of the bicycle (which is not shown) is a sprocket wheel. The sprocket wheel is also not shown. To minimize the possibility of lateral displacement of the crank arm 10 when it is installed in position, a second point of connection beyond the spline connection 24 is required. This second point of connection is obtained through the use of a small plug 44 which is weldingly secured by weld bead 46 within hole 48 formed within the tubular housing 12. The small plug 44 includes a centrally disposed threaded opening 50. A fastener (not shown) is to engage with the threaded opening 50 with this fastener being mounted within the sprocket wheel.

The outer end 16 of the housing 12 includes a triangularly shaped recess 52. This recess 52 is formed within both side walls of the housing 12. This recess 52 has an innermost edge defined as an apex 54. This apex 54 coincides with the longitudinal center axis 42. It is to be noted that the wall thickness of the housing 12 in the area of apex 54 is greater than the wall thickness located at the outer edges of the recess 52. This increased wall thickness is important for providing increased strength between the housing 12 and the plug 56 which is mounted within the recess 52.

The plug 56 is formed of steel, titanium or magnesium alloy or other similar type of material. Plug 56 includes an interior threaded through hole 58. The exterior surface of the plug 56 is irregularly shaped defining an outwardly extending section 60. In essence, the configuration of the plug 56 is that of a teardrop. The outwardly extending section 60 is located against the apex 54. Plug 56 includes a hole 57. Plug 22 includes a hole 23. Holes 57 and 23 are to provide for escape of any water that may collect within interior chamber 18.

Figure 2:
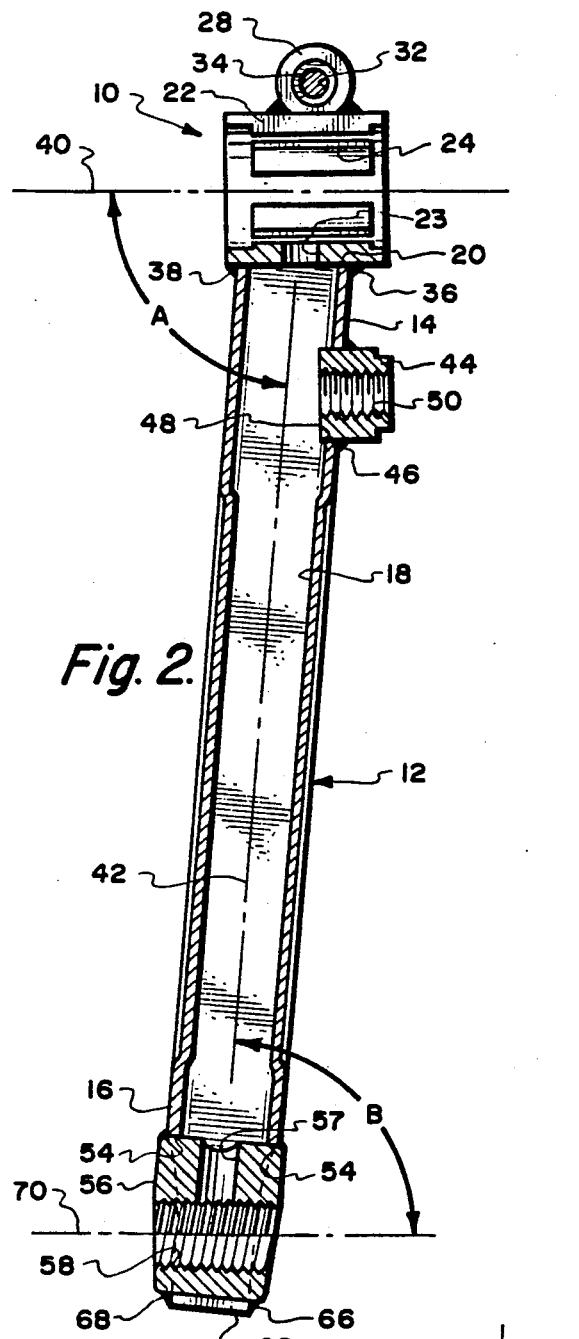
FIG. 2 is a cross-sectional view of the crank arm of the present invention taken along line 2—2 of FIG. 1.
Figure 3:
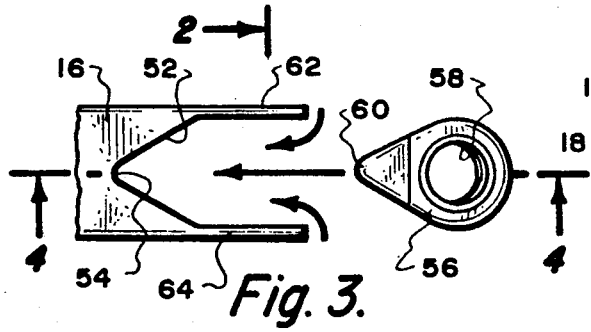
FIG. 3 is a view of the outer end of the crank arm depicting installation of the plug within the housing of the crank arm.
Figure 4:
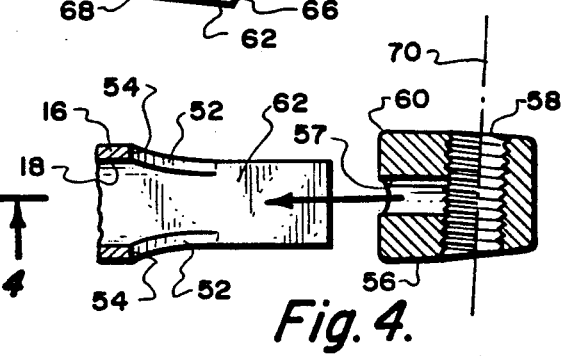
FIG. 4 is a cross-sectional view taken along line 4—4 of FIG. 3.

Initially, the outer end of the housing 12 is constructed to include outwardly extending flanges 62 and 64. When the plug 56 is installed in position as shown in FIGS. 1 and 2 of the drawing, flanges 62 and 64 are physically bent over on top of the plug 56 to thereby retain the plug 56 in its desired established position. Because of the outwardly extending section 60 being mounted within the recess 52, there is established a mechanical connection between the plug 56 and the housing 12 preventing rotation of the plug 56. In order to positively fix in position the plug 56, weld beads 66 and 68 are produced which function to securely lock in position the plug 56 onto the housing 12.

Threaded opening 58 is mounted within the plug 56 so that the longitudinal center axis 70 of the opening 58 is canted slightly, about five degrees. The plug 56 is to be installed within the recess 52 so that the longitudinal center axis 70 is located parallel to the longitudinal center axis 40. This means that angle B, between the axes 42 and 70, equals angle A. The pedal (not shown) is to be threadably connected to the opening 58 and is to be fixedly mounted thereto.

When the operator applies the torque through the pedal to the plug 56, it can be seen that this force is transmitted not only through the weld beads 66 and 68 to the housing 12 but also mechanically through the outwardly extending section 60 and the recess 52. In actual practice, there could be a partial failure of the weld beads 66 and 68 and the crank arm 10 could still be used because of this mechanical connection. In the prior art, when the equivalent weld beads failed, the plug would rotate relative to the housing of the crank arm resulting in complete failure of the crank arm and making the crank arm not usable.

What is claimed is:

1. A crank arm adapted to be connected between a pedal and a hub bearing assembly of a bicycle, said crank arm comprising:

an elongated tubular housing having an inner end and an outer end, said housing having a first longitudinal center axis;

a spline connection located at said inner end, said spline connection having a second longitudinal center axis, said second longitudinal center axis being located transverse to said first longitudinal center axis, said spline connection being fixed to said housing, said spline connection adapted to engage a hub bearing assembly of a bicycle; and a threaded connection located at said outer end, said threaded connection having a third longitudinal center axis, said third longitudinal center axis being located transverse to said first longitudinal center axis, said threaded connection adapted to engage a bicycle pedal, said threaded connection being formed within a plug, said plug having an exterior surface, said exterior surface having a teardrop shape, said teardrop shape establishing a mechanical connection with said housing in addition to a welding connection, said mechanical connection preventing rotation of said plug relative to said housing.

2. The crank arm as defined in claim 1 wherein:

said second longitudinal center axis being located at an acute angle relative to said first longitudinal center axis, said third longitudinal center axis being located at an acute angle relative to said first longitudinal center axis, each said acute angle being identical with said second longitudinal center axis being parallel to said third longitudinal center axis.

3. The crank arm as defined in claim 2 wherein:

said acute angle being approximately eighty-five degrees.

4. The crank arm as defined in claim 3 wherein:

said teardrop shape of said plug including an outwardly extending section, said outwardly extending section being mounted within said tubular housing, said outwardly extending section is located nearest said spline connection.

5. The crank arm as defined in claim 1 wherein:

said teardrop shape of said plug including an outwardly extending section, said outwardly extending section being mounted within said tubular housing, said outwardly extending section is located nearest said spline connection.

* * * * *